(12) United States Patent
Jeon et al.

(10) Patent No.: US 10,917,182 B2
(45) Date of Patent: Feb. 9, 2021

(54) METHOD AND APPARATUS FOR MITIGATING INTERFERENCE IN WIRELESS COMMUNICATION SYSTEM

(71) Applicant: Samsung Electronics Co., Ltd., Suwon-si (KR)

(72) Inventors: Joseph Jeon, Seongnam-si (KR); Eunyong Kim, Yongin-si (KR); Jaewon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 15/767,879

(22) PCT Filed: Oct. 6, 2016

(86) PCT No.: PCT/KR2016/011163
§ 371 (c)(1),
(2) Date: Apr. 12, 2018

(87) PCT Pub. No.: WO2017/065453
PCT Pub. Date: Apr. 20, 2017

(65) Prior Publication Data
US 2018/0302176 A1   Oct. 18, 2018

(30) Foreign Application Priority Data
Oct. 13, 2015   (KR) .................. 10-2015-0143017

(51) Int. Cl.
*H04W 36/06*   (2009.01)
*H04B 15/02*   (2006.01)
(Continued)

(52) U.S. Cl.
CPC ............. *H04B 15/02* (2013.01); *H04B 7/024* (2013.01); *H04J 11/0053* (2013.01);
(Continued)

(58) Field of Classification Search
CPC ................................................. H04J 2211/001
See application file for complete search history.

(56) References Cited

U.S. PATENT DOCUMENTS 9,628,215 B2 * 4/2017 Tan ...................... H04J 11/005
2009/0130980 A1  5/2009 Palanki et al.
(Continued)

FOREIGN PATENT DOCUMENTS

| CN | 103581073 A | 2/2014 |
| CN | 104956714 A | 9/2015 |

(Continued)

OTHER PUBLICATIONS

Extended European Search Report dated Aug. 8, 2018, issued in European Application No. 16855670.2.
(Continued)

*Primary Examiner* — Cindy Trandai
(74) *Attorney, Agent, or Firm* — Jefferson IP Law, LLP

(57) ABSTRACT

A method for a terminal mitigating interference in a wireless communication system according to an embodiment of the present invention comprises the steps of: receiving a first message having a previously configured pattern from a serving base station communicating cooperatively to control interference with at least one adjacent base station; triggering a common reference signal (CRS) interference mitigation function of the terminal in response to the first message in order to mitigate interference due to a CRS transmitted from the at least one adjacent base station; and cancelling interference due to the CRS on the basis of the CRS interference mitigation function, and receiving data.

11 Claims, 13 Drawing Sheets

(51) Int. Cl.
*H04L 1/00* (2006.01)
*H04B 7/024* (2017.01)
*H04J 11/00* (2006.01)
*H04L 5/00* (2006.01)
*H04W 72/04* (2009.01)

(52) U.S. Cl.
CPC ............ *H04L 1/0002* (2013.01); *H04L 5/005* (2013.01); *H04L 5/0035* (2013.01); *H04L 5/0073* (2013.01); *H04L 5/001* (2013.01); *H04W 72/0426* (2013.01)

(56) References Cited

U.S. PATENT DOCUMENTS

| | | | | |
|---|---|---|---|---|
| 2010/0041409 A1* | 2/2010 | Kim | ................ | H04L 1/0002 455/450 |
| 2011/0286346 A1* | 11/2011 | Barbieri | ................ | H04B 17/327 370/252 |
| 2011/0312316 A1* | 12/2011 | Baldemair | ............. | H04L 5/001 455/422.1 |
| 2012/0122440 A1* | 5/2012 | Krishnamurthy | ..... | H04L 5/0053 455/418 |
| 2012/0157082 A1* | 6/2012 | Pedersen | ............... | H04W 24/10 455/422.1 |
| 2013/0182799 A1* | 7/2013 | Geirhofer | ............... | H04L 27/00 375/340 |
| 2013/0215785 A1* | 8/2013 | Jung | ................ | H04J 11/005 370/252 |
| 2013/0229971 A1* | 9/2013 | Siomina | ................ | H04W 24/10 370/312 |
| 2013/0279361 A1* | 10/2013 | Seo | ................ | H04J 11/0053 370/252 |
| 2013/0279437 A1* | 10/2013 | Ng | ................ | H04W 16/14 370/329 |
| 2014/0112216 A1* | 4/2014 | Seo | ................ | H04J 11/005 370/280 |
| 2014/0126403 A1 | 5/2014 | Siomina | | |
| 2014/0200001 A1* | 7/2014 | Song | ................ | H04W 36/0094 455/436 |
| 2014/0233457 A1* | 8/2014 | Koutsimanis | .......... | H04J 11/005 370/328 |
| 2014/0254559 A1 | 9/2014 | Tie et al. | | |
| 2015/0016331 A1 | 1/2015 | Kim et al. | | |
| 2015/0131631 A1* | 5/2015 | Chen | ................ | H04W 24/02 370/336 |
| 2015/0189526 A1* | 7/2015 | Yang | ................ | H04W 72/085 370/252 |
| 2015/0296400 A1* | 10/2015 | Yang | ................ | H04W 16/32 370/252 |
| 2015/0358105 A1 | 12/2015 | Jung et al. | | |
| 2015/0358855 A1 | 12/2015 | Yang et al. | | |
| 2015/0358974 A1* | 12/2015 | Jung | ................ | H04W 72/048 370/329 |
| 2015/0372779 A1* | 12/2015 | Lim | ................ | H04J 11/005 370/338 |
| 2016/0249375 A1* | 8/2016 | Auer | ................ | H04W 72/1226 |
| 2016/0345338 A1 | 11/2016 | Kim et al. | | |
| 2017/0207898 A1* | 7/2017 | Yang | ................ | H04J 11/00 |
| 2017/0208500 A1* | 7/2017 | Jung | ................ | H04J 11/00 |

FOREIGN PATENT DOCUMENTS

| | | |
|---|---|---|
| KR | 10-2014-0114759 A | 9/2014 |
| WO | 2014/112716 A1 | 7/2014 |
| WO | 2014/123388 A1 | 8/2014 |
| WO | 2014/128621 A1 | 8/2014 |
| WO | 2015/115784 A1 | 8/2015 |

OTHER PUBLICATIONS

Chinese Office Action dated May 22, 2019, issued in a counterpart Chinese application No. 201680060064.8.

* cited by examiner (a) INITIAL TRANSMISSION ALLOCATION RATE WHEN
CS AND CRS-IM ARE SIMULTANEOUSLY REFLECTED (b) INCREASE IN INITIAL TRANSMISSION ALLOCATION RATE WHEN REFLECTING ONLY CS

METHOD AND APPARATUS FOR MITIGATING INTERFERENCE IN WIRELESS COMMUNICATION SYSTEM

TECHNICAL FIELD

Various embodiments of the present disclosure relate to a method and a device for controlling interference in a communication network, and more particularly, to a method and a device for controlling interference which are capable of allowing a terminal to perform a Common Reference Signal (CRS) interference mitigation function and improving reception efficiency of the terminal in an interference control section through the mitigation.

BACKGROUND ART

In the 3rd Generation Partnership Project (3GPP) standard, in order to support Cooperative Multi-Point (CoMP) operation for inter-base station interference control and cooperative communication, the terminal separately measures channel information from neighboring base stations including a serving base station and defines a signal between the base station and the terminal that can feed back to the serving base station.

In addition, when a pico base station is located in a macro base station, the Further Enhanced Inter Cell interference Cancellation (FeICIC) for interference control is defined.

In addition to a method of controlling interference, which is caused by the macro base station, on the terminal receiving data from the pico base station using the Almost Blank Subframe (ABS) scheme, the FeICIC defines a signal for the pico base station to transmit macro base station information to the terminal so that common reference signal (CRS) interference transmitted even in the ABS time slot can be mitigated on the terminal (CRS-Interference Mitigation; CRS-IM).

The macro base station transmits, to the pico base station, control information (ABS pattern information) which is in units of time slots in which the macro base station does not cause interference on the pico base station in the macro base station area, and measurement subset information made of a subset of the ABS pattern information.

The pico base station transmits the measurement subset information to the terminal that receives downlink data from the pico base station, and performs channel measurement without interference from the macro base station in the subframe corresponding to the time slot, which makes it possible to separately perform Channel Quality Indicator (CQI) measurement for link connection (for example, RSRP, RSRQ) and data reception.

However, when the macro base station transmits the ABS pattern information to the pico base station, and the pico base station transmits the measurement subset information, which is the subset of the ABS pattern information, to the terminal, resources for allocating data are consumed, which may be a problem.

DISCLOSURE OF INVENTION

Technical Problem

An object of the present disclosure is directed to provision of a method and a device for controlling interference which are capable of allowing a terminal to perform a CRS interference mitigation function and improving reception efficiency of the terminal in an interference control section through the mitigation.

Solution To Problem

Various embodiments of the present disclosure are directed to the provision of an interference control method of a terminal in a wireless communication system, the method including receiving a first message having a preset pattern from a serving base station that performs cooperative communication for interference control with at least one adjacent base station, triggering a common reference signal (CRS) interference mitigation function in response to the first message to mitigate interference caused by the CRS transmitted by the at least one adjacent base station, and removing the interference caused by the CRS based on the CRS interference mitigation function to receive data.

The interference control method may further includes receiving a second message including at least one physical cell ID corresponding to the at least one adjacent base station from the serving base station so as to identify the CRS transmitted from the at least one adjacent base station.

The second message may further include information on an adjacent base station which is a target of the CRS interference mitigation function.

The interference control method may further include transmitting a third message indicating whether the terminal supports the CRS interference mitigation function to the serving base station.

A data transmission rate of the serving base station to the terminal may be determined based on a Signal to Interference-plus-noise Ratio (SINR) of the serving base station to the terminal, and the SINR may be determined in relation to an interference signal strength reflecting the interference caused by the CRS which is removed based on the CRS interference mitigation function of the terminal.

Further, various embodiments of the present disclosure are directed to the provision of an interference control method of a base station in a wireless communication system, the method including checking whether a terminal supports a CRS interference mitigation function for mitigating interference caused by a CRS transmitted from at least one adjacent base station which is adjacent to the base station, generating a first message having a preset pattern, and transmitting the first message to the terminal if the terminal supports the CRS interference mitigation function, in which the base station performs cooperative communication for interference control with the at least one adjacent base station.

Still further, various embodiments of the present disclosure are directed to the provision of a terminal capable of controlling interference in a wireless communication system, the terminal including a transceiver configured to transmit and receive signals to and from a plurality of base stations, and a controller configured to receive a first message having a preset pattern from a serving base station that performs cooperative communication for interference control with at least one adjacent base station, trigger a CRS interference mitigation function in response to the first message to mitigate interference caused by the CRS transmitted by the at least one adjacent base station, and remove the interference caused by the CRS based on the CRS interference mitigation function to receive data.

Still Further, various embodiments of the present disclosure are directed to the provision of a base station capable of controlling interference in a wireless communication system, the base station including a transceiver configured to transmit and receive signals to and from a terminal; and a controller configured to check whether the terminal supports a CRS interference mitigation function for mitigating interference caused by a CRS transmitted from at least one adjacent base station which is adjacent to the base station, generate a first message having a preset pattern, and transmit the first message to the terminal if the terminal supports the CRS interference mitigation function, in which the base station performs cooperative communication for interference control with the at least one adjacent base station.

Advantageous Effects of Invention

According to the embodiment of the present disclosure, the method and the device for controlling interference in the wireless communication system allows the terminal to perform the CRS interference mitigation function in an environment in which inter-cell interference control and cooperative communication are performed, and accordingly improve reception efficiency of the terminal in the interference control interval. Therefore, downlink data transmission efficiency in the wireless communication system can be enhanced.

BEST MODE FOR CARRYING OUT THE INVENTION

Figure 1:
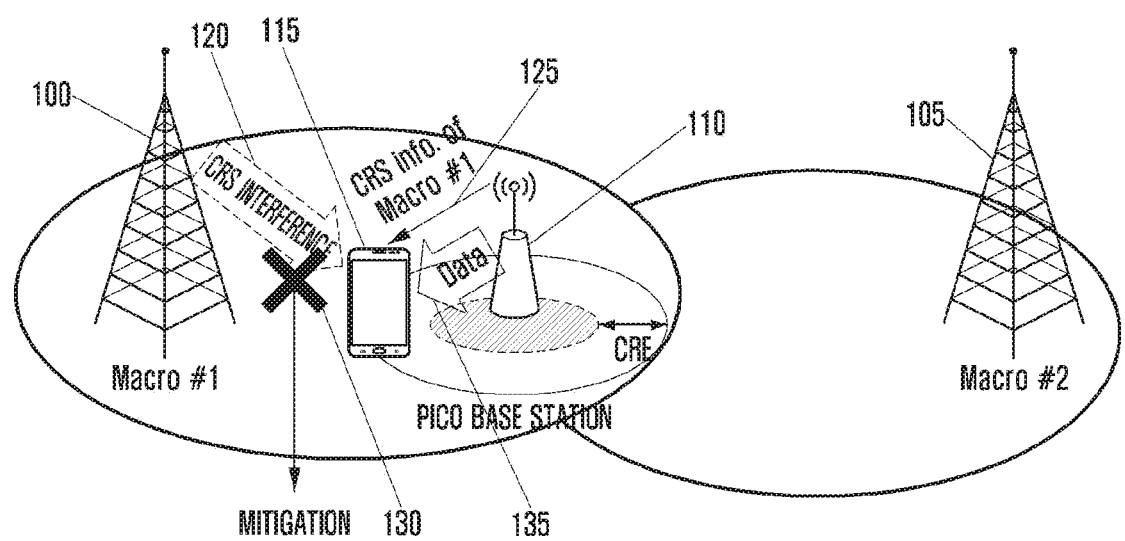
FIG. 1 is a diagram illustrating a process in which a terminal receiving data from a pico base station mitigates CRS interference from a macro base station.

Hereinafter, exemplary embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

Further, in describing in detail embodiments of the present disclosure, an advanced E-UTRA (or referred to as LTE-A) system supporting a carrier aggregation will be mainly described. However, a main subject of the present disclosure may be slightly changed to be applied to other communication systems having similar technical backgrounds and channel forms without greatly departing the scope of the present disclosure, which may be determined by those skilled in the art to which the present disclosure pertains. For example, a main subject of the present disclosure may also be applied even to a multicarrier HSPA supporting the carrier aggregation.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

FIG. 1 is a diagram illustrating a process in which a terminal receiving data from a pico base station mitigates CRS interference from a macro base station. Referring to FIG. 1, a wireless communication system 10 includes a first macro base station 100, a second macro station 105, and a pico base station, and a terminal 115.

The terminal 115 receiving data from the pico base station 110 may suffer interference caused by the CRS transmitted from the first macro base station 100 adjacent to the pico base station 110.

The pico base station 110 transmits interference control information of the first macro base station 100, that is CRS information of the first macro base station 100, to the terminal 115, and the terminal 115 may mitigate interference 120 caused by the CRS transmitted from the first macro base station 100 using the CRS information 125 of the first macro base station 100.

According to an embodiment of the present disclosure, the pico base station 110 may transmit a first message having a predetermined pattern as the CRS information 125 to the terminal 115, and the terminal 115 may perform a CRS interference mitigation function in response to the first message. The terminal 115 may remove the CRS transmitted from the first macro base station 100 by performing the CRS interference mitigation function.

In the present disclosure, the CRS Interference Mitigation (CRS-IM) function of the terminal means that, except for channel measurement for link connection and data reception utilized in the FeICIC, the terminal removes CRSs of neighboring cells which are mixed and received in data areas (physical downlink shared channels: PDSCHs) at the time of data reception. The terminal may receive information regarding the neighboring cells from the base station, recognize the locations of the CRSs in the data areas using the information regarding the neighboring cells, and remove the CRSs.

The terminal 115 may mitigate the interference 120 caused by the CRS transmitted from the first macro base station 100 to receive data 135 from the pico base station 110.

Figure 2:
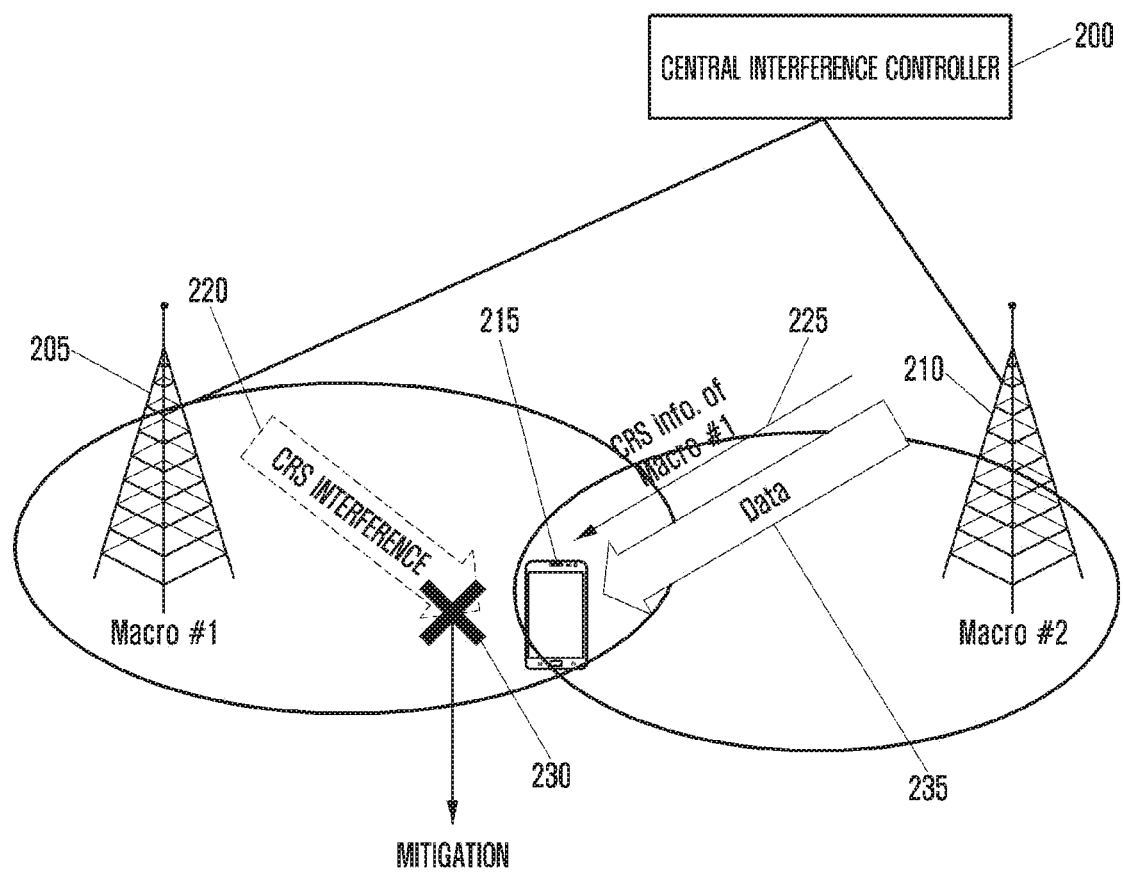
FIG. 2 is a diagram illustrating a process in which a terminal receiving data from a macro base station mitigates CRS interference from another macro base station.

FIG. 2 is a diagram illustrating a process in which a terminal receiving data from a macro base station mitigates CRS interference from another macro base station. Referring to FIG. 2, a wireless communication system 20 includes a central interference controller 200, a first macro base station 205, a second base station 210, and a terminal 215.

The central interference controller 200 may perform an interference control and cooperative communication between the first macro base station 205 and the second macro base station 210.

The terminal 215 receiving data from the second macro base station 210 may suffer interference 220 caused by a CRS transmitted from the first macro base station 205 adjacent to the second macro base station 210.

The second macro base station 210 may transmit interference control information of the first macro base station 205, that is, the CRS information 225 of the first macro base station 205, to the terminal 215, and mitigate the interference caused by the CRS transmitted from the first macro base station 205 using the CRS information 225 of the first macro base station 205.

According to an embodiment of the present disclosure, the second macro base station 210 may transmit a first message having a predetermined pattern as the CRS information 225 to the terminal 215, and the terminal 215 may perform a CRS interference mitigation function in response to the first message. The terminal 115 may remove the CRS transmitted from the first macro base station 205 by performing the CRS interference mitigation function.

The terminal 215 may mitigate the interference 220 caused by the CRS transmitted from the first macro base station 205, and then receive data 235 from the pico base station 210.

Figure 3:
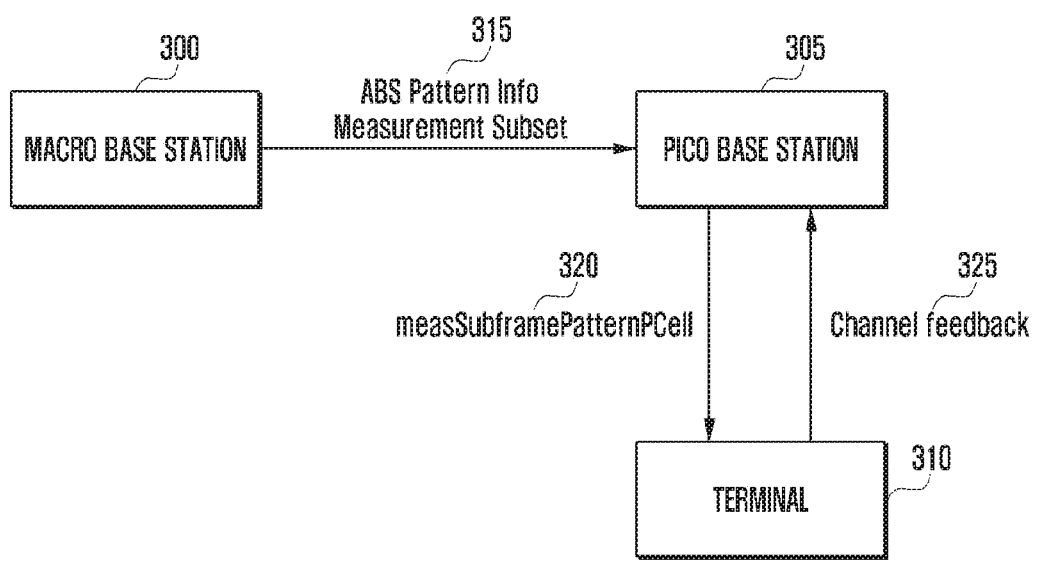
FIG. 3 is a diagram illustrating an information exchange method for time slot interference control according to an embodiment of the present disclosure.

FIG. 3 is a diagram illustrating an information exchange method for time slot interference control according to an embodiment of the present disclosure. Here, the time slot interference control means that ABS is performed by a base station.

Referring to FIG. 3, a wireless communication system 30 includes a macro base station 300, a pico base station 305, and a terminal 310.

The macro base station 305 may transmit ABS pattern information (ABS pattern information measurement subset) 315 representing the pattern of ABS to the pico base station so as to operate the CRS interference function of the terminal 310.

The pico base station 305 may generate a measurement subset representing a subset of the ABS pattern based on the received ABS pattern information 315. The pico base station 305 may transmit a measurement subset message (measSubframePatternPCell) 320 including the measurement subset to the terminal 310.

The ABS pattern information 315 may be a bitmap for 40 ms representing the pattern of the ABS. Here, one bit may correspond to one ms (that is, a subframe).

The terminal 310 may transmit channel feedback 325 on the measurement subset message 320 to the pico base station 305. The terminal 310 may perform channel measurement in each of an ABS interval and a non-ABS interval through the channel feedback 325.

Since operation is performed independently of the FeICIC in the present disclosure, even if the ABS pattern information 315 is not received from the macro base station 300, the pico base station 305 may the measurement subset message 320 to the terminal 310 by itself.

The measurement subset message 320 may be a bitmap of a preset type, for example, the measurement subset message 320 may be all composed of '0's or '1's. The terminal receiving the measurement subset message 320 all composed of '0's or '1's may recognize that the base station area is the area in which interference control is performed independently of the ABS, and may perform the CRS interference mitigation function.

According to the embodiment of the present disclosure, the macro base station 300 may transmit the measurement subset message 320 of a form that is directly preset, for example, that is all composed of '0's or '1's, to the terminal 310.

That is, the present disclosure relates to a scheduling method, which, when an inter-base station interference control technique, for example, the eICIC cooperative communication is used, allows the terminal 310 to mitigate the CRS interference using the message having the preset pattern without setting the ABS, which leads to the transmission efficiency gain of the terminal 310.

Figure 4:
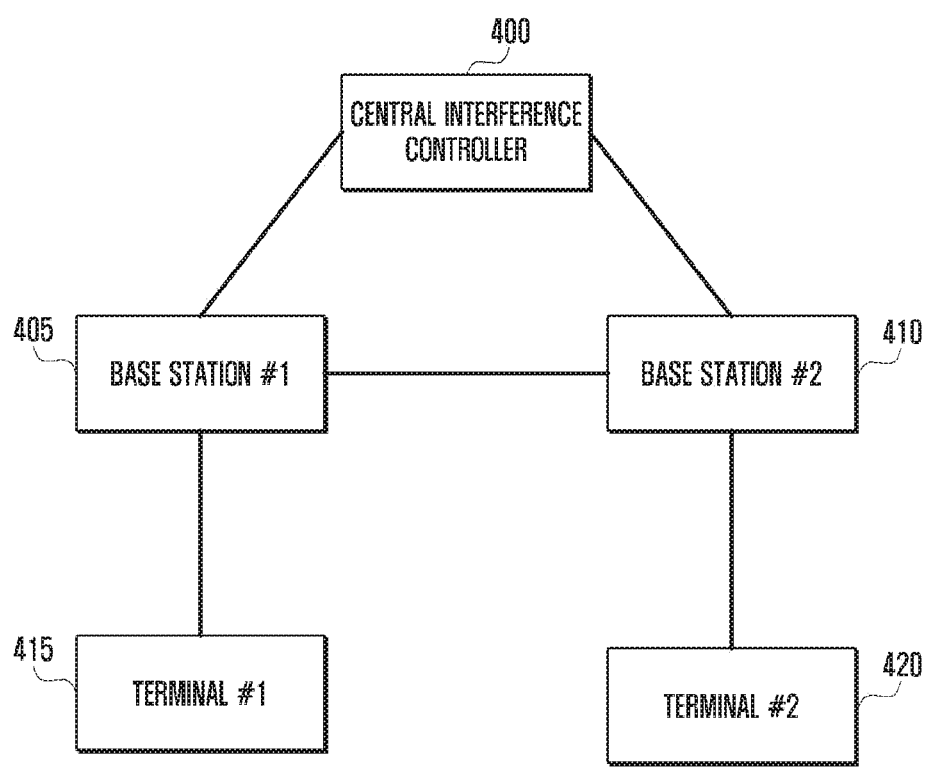
FIG. 4 is a diagram illustrating a centralized interference control and cooperative communication configuration.

FIG. 4 is a diagram illustrating a centralized interference control and cooperative communication configuration. Referring to FIGS. 1 to 4, the wireless communication system 40 includes a central interference controller 400, a first base station 405, a second base station 410, a first terminal 405, and a second terminal 420.

The central interference controller 400 may perform a interference control and cooperative communication between the first base station 405 and the second base station 410. Here, each of the first base station 405 and the second base station 410 may be a macro base station or a pico base station.

The first terminal 415 may receive downlink data from the first base station 405 under the control of the central interference controller 400, and the second terminal 420 may receive downlink data from the second base station 410 under the control of the central interference controller 400.

According to the embodiment of the present disclosure, the first base station 405 may transmit a first message having a preset pattern to the first terminal 415. The first terminal 415 may trigger a CRS interference mitigation function of the first terminal 415 in response to the first message so as to mitigate the interference caused by the CRS transmitted from the second base station 410, and remove the interference caused by the CRS to receive data from the first base station 405.

According to the embodiment of the present disclosure, the second base station 410 may transmit a second message having a preset pattern to the second terminal 420. The second terminal 420 may trigger a CRS interference mitigation function of the second terminal 420 in response to the second message so as to mitigate the interference caused by the CRS transmitted from the first base station 405, and remove the interference caused by the CRS to receive data from the second base station 410.

Figure 5:
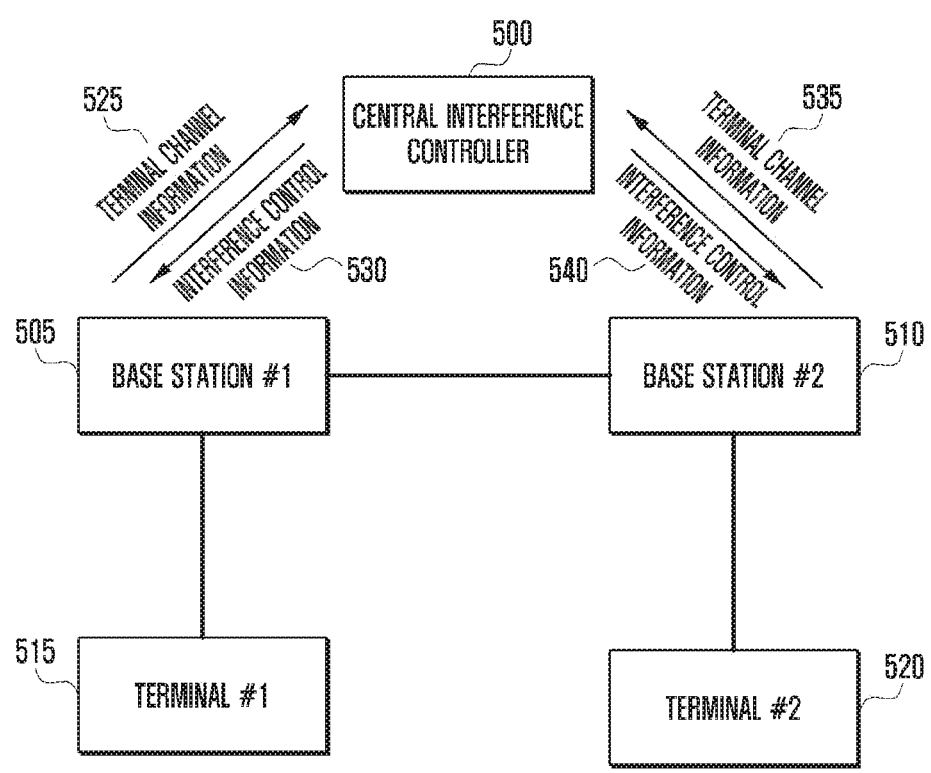
FIG. 5 is a diagram illustrating an information exchange method for controlling interference in the centralized interference control and cooperative communication configuration.

FIG. 5 is a diagram illustrating an information exchange method for controlling interference in the centralized interference control and cooperative communication configuration. Referring to FIGS. 1 to 5, a wireless communication system 50 includes a central interference controller 500, a first base station 505, a second base station 510, a first terminal 515, and a second terminal 520. Constituent elements 500 to 520 of the wireless communication system 50 illustrated in FIG. 5 have functions and operations substantially identical with constituent elements 400 to 420 of the wireless communication system 40 illustrated in FIG. 4.

The central interference controller 500 may receive terminal channel information 525 from the first base station 505, analyze the terminal channel information 525, generate interference control information 530 according to the analysis result, and transmit the interference control information 530 to the first base station 505. The first base station 505 may transmit downlink data to the first terminal 515 based on the interference control information 530.

The central interference controller 500 may receive terminal channel information 535 from the second base station 510, analyze the terminal channel information 535, generate interference control information 540 according to the analysis result, and transmit the interference control information 540 to the second base station 520. The second base station 510 may transmit downlink data to the second terminal 520 based on the interference control information 540.

Figure 6:
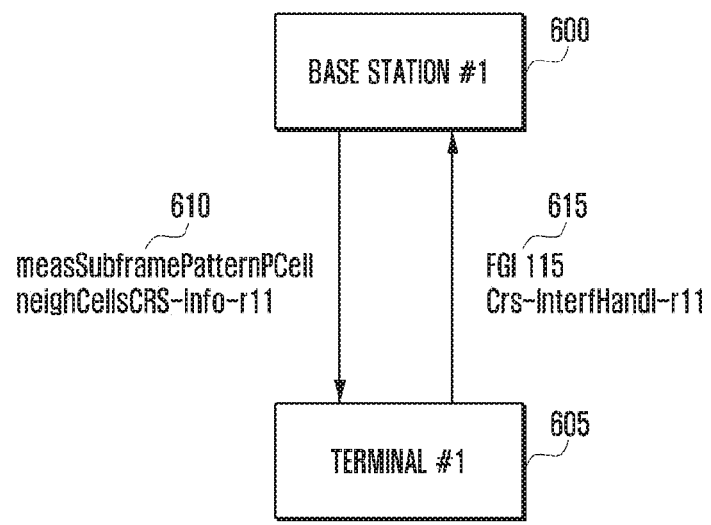
FIG. 6 is a diagram illustrating a message exchange method between a base station and a terminal according to an embodiment of the present disclosure.

FIG. 6 is a diagram illustrating a message exchange method between a base station and a terminal according to an embodiment of the present disclosure. Referring to FIGS. 1 to 6, a first base station 600 may transmit, to a first terminal 605, a cell information message (neighCellsCRS-Info-r11) 615 including at least one physical cell ID corresponding to at least one adjacent base station, along with a measurement subset message (measSubframePatternPCell) 610.

The measurement subset message 610 may be a message having a preset pattern, for example, all composed of '0's or '1's. The cell information message 615 may be for identifying the CRS transmitted from the at least one adjacent base station that is adjacent to the first base station 600 to the first terminal 605.

According to the embodiment, the first base station 600 may transmit, to the first terminal 605, a message including information on an adjacent base station that is the target of the CRS interference mitigation function of the first terminal 605.

The first terminal 605 may transmit, to the first base station 600, a identification message (FGI 115, Crs-Inter-Handle-r11) 620 for distinguishing the first terminal 605 from other terminals.

According to the embodiment, the first terminal 605 may transmit the identification message 620 as a response request message before receiving the measurement subset message 610 and the cell information message 615 from the first base station 600. According to the embodiment, the identification message 620 may further include whether the first terminal 605 supports the CRS interference mitigation function.

Figure 7:
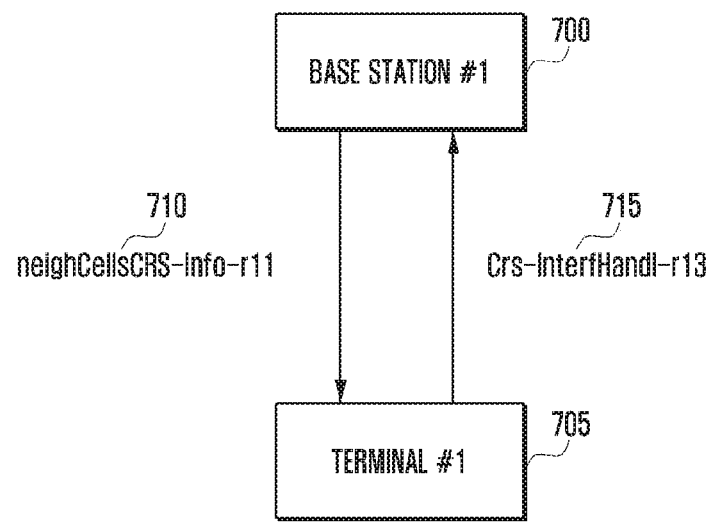
FIG. 7 is a diagram illustrating a message exchange method between a base station and a terminal according to another embodiment of the present disclosure.

FIG. 7 is a diagram illustrating a message exchange method between a base station and a terminal according to another embodiment of the present disclosure. Referring to FIGS. 1 to 7, the first base station 700 may transmit, to a first terminal 705, a cell information message (neighCellsCRS-Info-r11) 710 including at least one physical cell ID corresponding to at least one adjacent base station.

The cell information message 710 may be for identifying the CRS transmitted from at least one base station that is adjacent to the first base station 700 to the first terminal 705. According to the embodiment, the first base station 700 may transmit, to the first terminal 705, a message including information on an adjacent base station that is the target of the CRS interference mitigation function of the first terminal 705.

Unlike the method illustrated in FIG. 6, in the method illustrated in FIG. 7, the first terminal 705 may operate the CRS interference mitigation function without receiving the measurement subset message from the first base station 700. That is, the first terminal 705 may automatically operate the CRS interference mitigation function without a separate trigger message. For example, the first terminal 705 may continue to operate the CRS interference mitigation function when powered on.

The first terminal 705 may transmit, to the first base station 700, a CRS operation message (Crs-InterHandl-r13) 715 indicating that the CRS interference mitigation function is operating. The first base station 700 may know whether the first terminal 705 operates the CRS interference mitigation function based on the CRS operation message 715, and perform scheduling for a plurality of terminals including the first terminal 705 depending on whether the CRS interference mitigation operations of the plurality of terminals.

According to the embodiment, the first terminal 705 may transmit the CRS operation message 715 to the first base station 700 as a response request message before receiving the cell information message 710 from the first base station 700.

Figure 8:
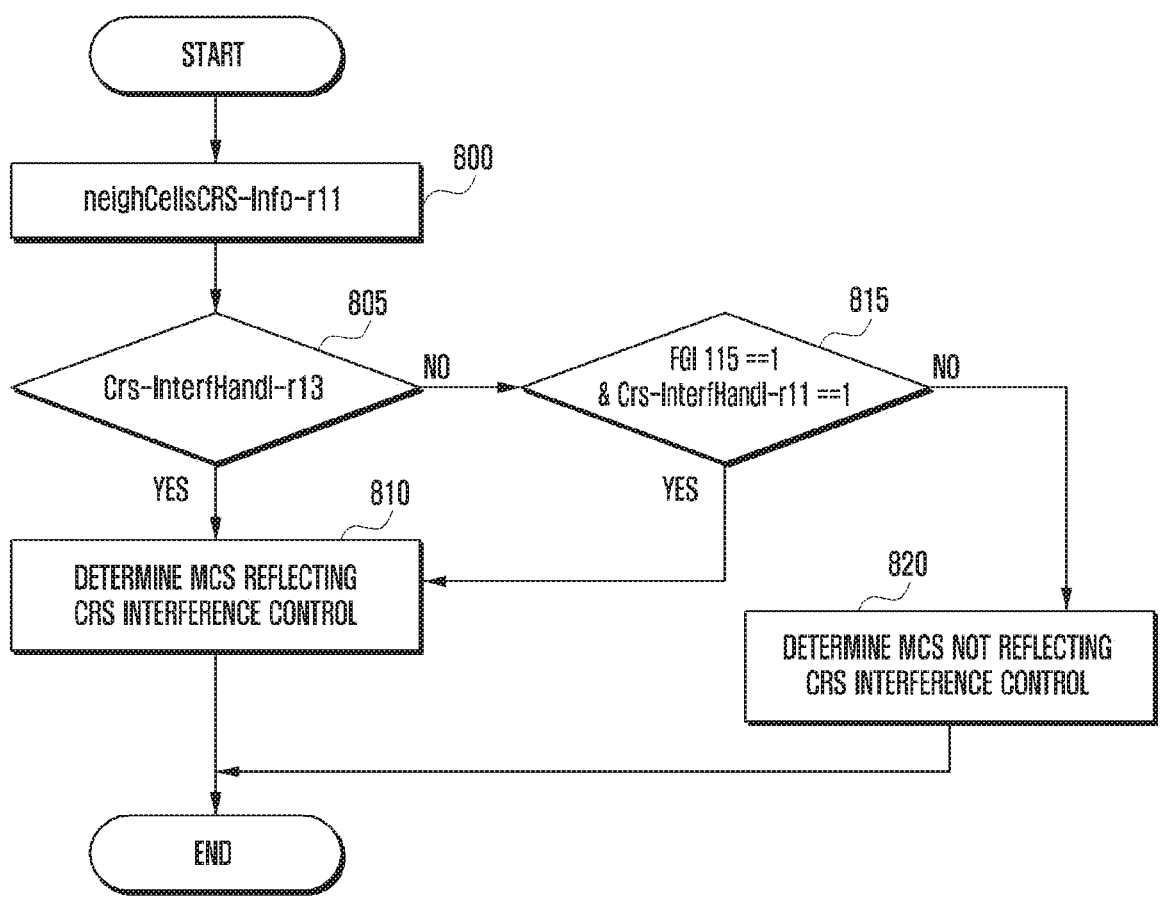
FIG. 8 is a flowchart illustrating a procedure in which a base station performs scheduling according to an embodiment of the present disclosure.

FIG. 8 is a flowchart illustrating a procedure in which a base station performs scheduling according to an embodiment of the present disclosure. Referring to FIGS. 1 to 8, in step 800, the base station may set a cell information message (neighCellsCRSO-Info-r11) including at least one physical cell ID corresponding to at least one adjacent base station. The base station may transmit the set cell information message to the terminal.

If the base station does not receive the CRS operation message (Crs-InterHandl-r13) of the terminal in step 805, the base station may determine whether the identification message (FGI 115, Brs-InterHandl-r11) for distinguishing the terminal from other terminals is received from the terminal in step 815.

The base station may check whether the terminal supports the CRS interference mitigation function for mitigating the interference caused by the CRS transmitted from at least one adjacent base station that is adjacent to the base station through the identification message (FGI 115, Crs-InterHandl-r11).

The base station may generate the first message having the preset pattern, and may transmit the first message to the terminal if the terminal supports the CRS interference mitigation function.

In step 810, if the base station receives the identification massage (FGI 115, Crs-InterHandl-r11) from the terminal, the base station may determine an MCS by reflecting the CRS interference control by the CRS interference mitigation function of the terminal.

In step 820, if the base station does not receive the identification message (FGI 115, Crs-InterHandl-r11) from the terminal, the base station may determine the MCS without reflecting the CRS interference control for the terminal.

Figure 9:
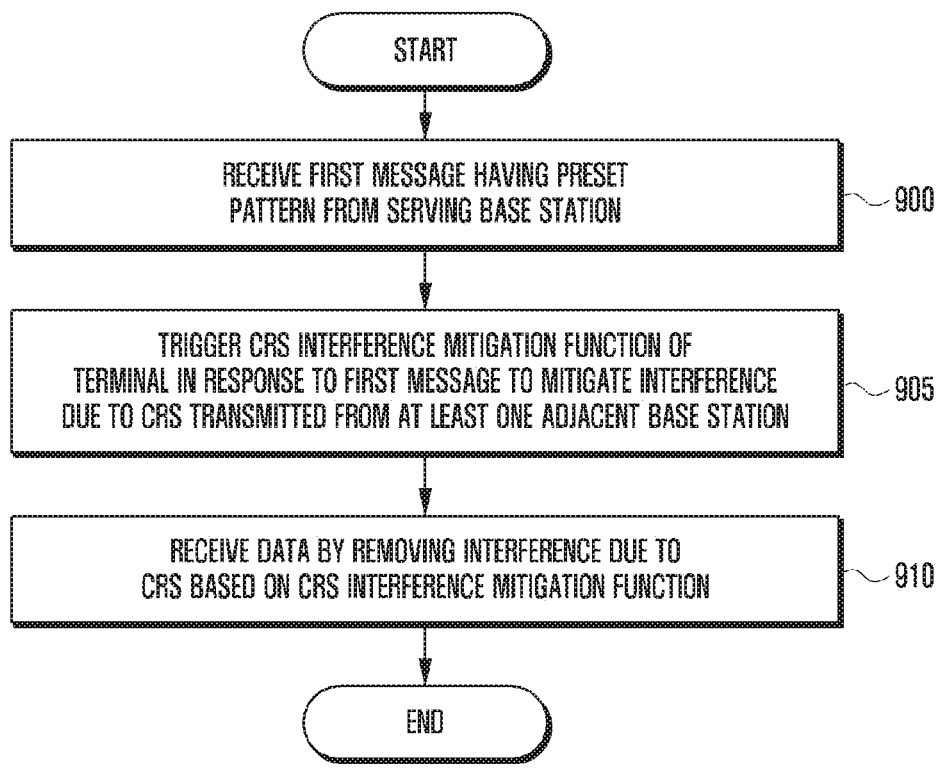
FIG. 9 is a flowchart illustrating a process in which a terminal controls interference in a wireless communication system according to an embodiment of the present disclosure.

FIG. 9 is a flowchart illustrating a process in which a terminal controls interference in a wireless communication system according to an embodiment of the present disclosure.

Referring to FIGS. 1 to 9, in step 900, the terminal may receive the first message having the preset message from the serving base station that performs cooperative communication for interference control with at least one adjacent base station. The first message may be the measurement subset message (measSubframePatternPCell) illustrated in FIGS. 3 and 6.

Here, the terminal may further receive, from the serving base station, the second message including at least one physical cell ID corresponding to at least one adjacent base station so as to identify the CRS transmitted from the at least one adjacent base station.

The second message may be the cell information message (neighCellsCRS-Info-r11) illustrated in FIGS. 6 and 7. According to the embodiment, the second message may further include information on an adjacent base station that is the target of the CRS interference mitigation function.

In addition, the terminal may further transmit, to the serving base station, a third message indicating whether the terminal supports the CRS interference mitigation function.

In step 905, the terminal may trigger the CRS interference mitigation function of the terminal in response to the first message so as to mitigate the interference caused by the CRS transmitted from at least one adjacent base station.

In step 910, the terminal may remove the interference caused by the CRS base on the CRS interference mitigation function to receive data from the serving base station.

Figure 10:
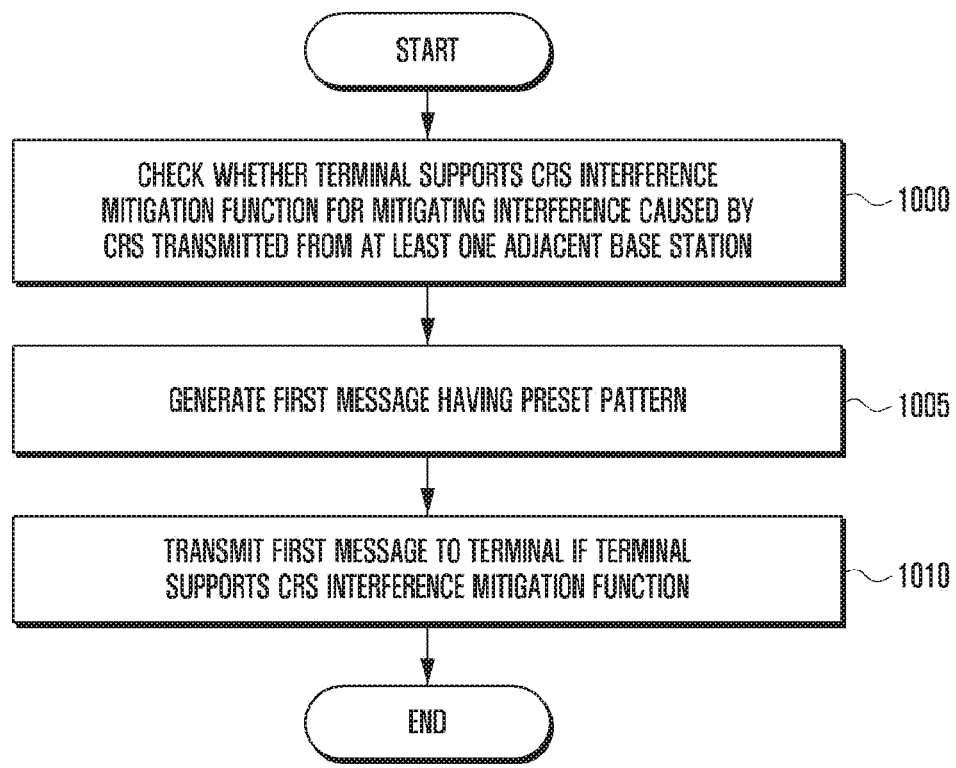
FIG. 10 is a flowchart illustrating a process in which a base station controls interference in a wireless communication system according to an embodiment of the present disclosure.

FIG. 10 is a flowchart illustrating a process in which a base station controls interference in a wireless communication system according to an embodiment of the present disclosure.

Referring to FIGS. 1 to 10, in step 1000, the base station may check whether the terminal supports the CRS interference mitigation function for mitigating the interference caused by the CRS transmitted from at least one adjacent base station.

To this end, the base station may receive, from the terminal, the message indicating whether the terminal supports the CRS interference mitigation function. The base station may check whether the terminal supports the CRS interference mitigation function based on the message.

The base station may perform cooperative communication for interference control with at least one adjacent base station.

In step 1005, the base station may generate the first message having the preset pattern, and in step 1010, the base station may transmit the first message to the terminal if the terminal supports the CRS interference mitigation function. The first message may be the measurement subset message (measSubframePatternPCell) illustrated in FIGS. 3 and 6.

The base station may transmit, to the terminal, the second message including at least one physical cell ID corresponding to at least one adjacent base station so as to identify the CRS transmitted from at least one adjacent base station. According to the embodiment, the second message may further include information on an adjacent base station that is the target of the CRS interference mitigation function.

Figure 11:
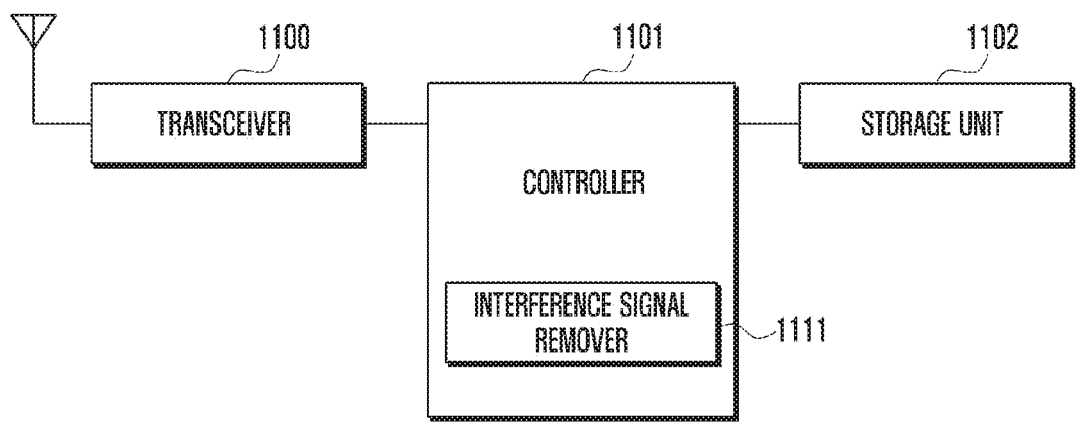

FIG. 11 is a diagram illustrating a configuration of a terminal according to an embodiment. The terminal may include a transceiver 1100, a controller 1110, and a storage unit 1120.

The transceiver 1100 performs transmission and reception of data for wireless communication of the terminal 60. The transceiver 1100 may transmit and receive signals to and from a plurality of base stations. The transceiver 1100 may be configured to include an RF transmitter for up-converting and amplifying frequencies of the transmitted signals, an RF receiver for low-noise amplifying the received signals and down-converting the frequencies, or the like.

In addition, the transceiver 1100 may receive data through a wireless channel and output the received data to the controller 1110, and may transmit the data output from the controller 1110 through the wireless channel.

The controller 1110 controls a signal flow between blocks so that the terminal 60 operates according to the embodiment of the present disclosure. More specifically, the controller 1110 may perform control to receive the first message having the preset pattern from the serving base station that performs cooperative communication for interference control with at least one adjacent base station, trigger the CRS interference mitigation function of the terminal 60 in response to the first message so as to mitigate the interference caused by the CRS transmitted from at least one adjacent base station, and remove the interference caused by the CRS based on the CRS interference mitigation function to receive data.

The controller 1110 may further include an interference signal remover 1111 so as to perform the above-mentioned function. The interference signal remover 1111 may remove the CRS interference signal from the reception signal of the terminal based on the interference control signal transmitted from the base station. According to the embodiment, the interference control signal may include the measurement subset message (measSubframePatternPCell) illustrated in FIGS. 3 and 6, the cell information message (neighCellsCRS-Info-r11) illustrated in FIGS. 6 and 7, or the like.

The interference signal remover 1111 may mitigate the interference caused by the CRS transmitted from at least one adjacent base station based on the interference control signal, and may obtain a desired signal for the terminal 60.

The storage unit 1120 may store programs and data necessary for the operation of the terminal 60, and may be divided into a program area and a data area.

Figure 12:
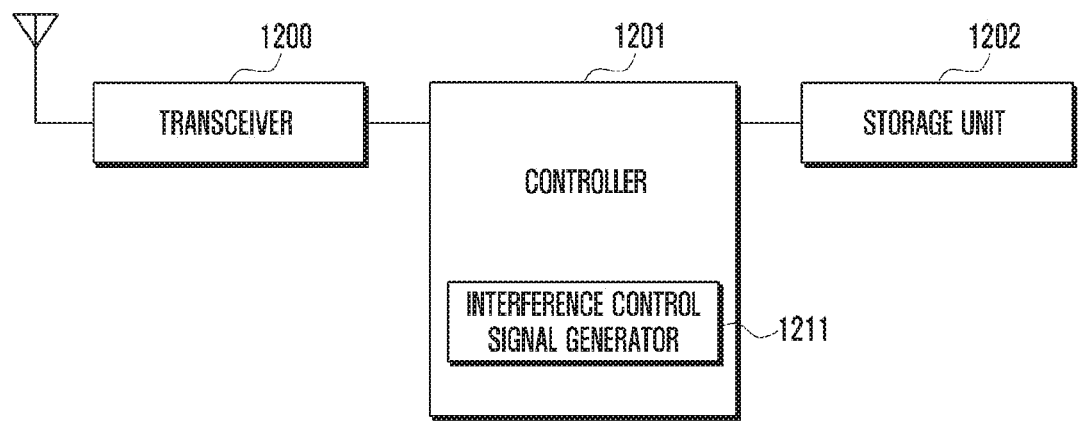
FIG. 12 is a diagram illustrating a configuration of a base station according to an embodiment of the present disclosure.

FIG. 12 is a diagram illustrating a configuration of a base station according to an embodiment of the present disclosure. Referring to FIG. 12, the base station 70 may include a transceiver 1200, a controller 1210, and a storage unit 1220.

The transceiver 1200 performs transmission and reception functions of data for wireless communication of the base station 70. The transceiver 1200 may transmit and receive signals to and from the terminal. The transceiver 1200 may be configured to include an RF transmitter for up-converting and amplifying frequencies of the transmitted signals, an RF receiver for low-noise amplifying the received signals and down-converting the frequencies, or the like.

In addition, the transceiver 1200 may receive data through a wireless channel and output the received data to the controller 1210, and may transmit the output data from the controller 1210 through the wireless channel.

The controller 1210 controls a signal flow between blocks so that the base station 70 operates according to the embodiment of the present disclosure. More specifically, the controller 1210 may perform control to receive the first message having the preset pattern from the serving base check whether the terminal supports the CRS interference mitigation function for mitigating the interference caused by the CRS, generate the first message having the preset pattern, and transmit the first message to the terminal if the terminal supports the CRS interference mitigation function.

The controller 1210 may further include an interference control signal generator 1211 so as to perform the above-mentioned function. The interference control signal generator 1211 may generate an interference control signal for removing the CRS interference signal from the adjacent base station that has an effect of interference on the terminal according to various embodiments of the present disclosure. According to the embodiment, the interference control signal may include the measurement subset message (measSubframePatternPCell) illustrated in FIGS. 3 and 6, the cell information message (neighCellsCRS-Info-r11) illustrated in FIGS. 6 and 7, or the like.

The storage unit 1220 may store programs and data necessary for the operation of the base station 70, and may be divided into a program area and a data area.

Figure 13:
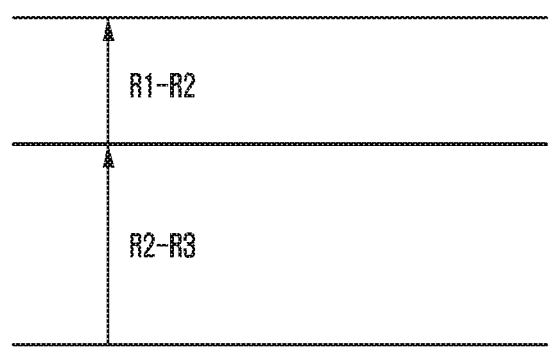
FIG. 13 is a diagram illustrating an effect of a data transmission rate according to the embodiment of the present disclosure.
Figure 13:
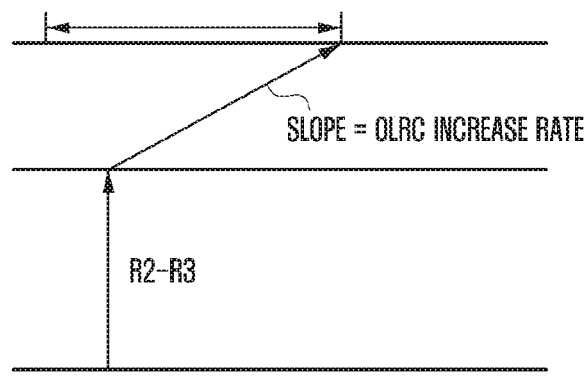

FIG. 13 is a diagram illustrating an effect of a data transmission rate according to the embodiment of the present disclosure.

Since the ABS is not utilized in the present disclosure, channel information feedback of the terminal according to the application of the CRS interference mitigation function cannot be received in the corresponding area. Therefore, in a case where there is no channel feedback of the terminal according to the application of the CRS interference mitigation function, the base station determines the data transmission rate for the corresponding terminal using separate channel information.

In the present disclosure, a method of modifying a channel quality estimation for the terminal according to interference control and applying multiple Outer-Loop Rate Controls (OLRCs) to the modified estimation is used. The data transmission rate R(A,k,M) for the terminal k transmitted from the serving base station A is determined by a function f(SINR(A,k,m)) of the SINR of the terminal K to the base station A, as expressed by the following expression (1). Here, the interference control information m is reflected, and the interference control information may mean a set of base stations to which the interference control is applied.

$$R(A, k, m) = f(SINR(A,k,m)) + OLRC(k,m) \quad (1)$$

The main interference, which is transmitted from the neighboring base stations and influences the reception of the data signal, may be divided into a control channel area and a data signal area. In the present embodiment, only the data signal area will be described on the assumption that the same control channel size is used. Reference signals may be transmitted in the data signal area, among which the CRS occupies the largest part of the area, and others such as a Channel State Information-Reference Signal (CSI-RS), a Demodulation Reference Signal (DM-RS), or the like occupies a very small part, which are not dealt with.

The CRS is defined in the 3GPP standard so as to be transmitted in a fixed position in all physical frequency and time domains, and may be allocated to a different area for each base station, such that the CRS area of the adjacent base station and the data reception area of the serving base station may overlap. Therefore, even if the adjacent base station does not transmit data, interference may occur due to the CRS at the time of data reception of the terminal. In this case, SINR(A,k,m) in (1) can be expressed as the following equation (2).

$$SINR(A,k,m) = R \times P(A,k) / \{Q_{iH(S-m)}I(i,k) + A_{iHm_a}\alpha EI(i,k) + Q_{iHm_b}\beta EI(i,k) + NI\} \quad (2)$$

where, R×P(A,k) denotes a reception strength from the serving base station A to the terminal k, i denotes an adjacent base station, S is a base station set that knows channel information, I(i,k) denotes an interference signal strength from the adjacent base station i to the terminal k, $m_a$ denotes, among the base station set to which the interference control is applied, a base station set that is not the target of the CRS interference mitigation function of the terminal k, α denotes the ratio of the CRS interference caused by the base station to which the interference control is applied, $m_b$ denotes, among the base station set to which the interference control is applied, a base station set that is the target of the CRS interference mitigation function of the terminal k, β denotes the residual interference ratio after the CRS interference mitigation function is applied in residual CRS interference, and NI denotes interference and thermal noise caused by the base station that does not know the channel information.

FIG. 13(a) is a diagram illustrating an initial transmission rate allocation when a Coordinated Scheduling (CS) and the CRS interference mitigation function of the terminal are simultaneously reflected according to the present embodiment.

The CS is a technology for reducing inter-cell interference by allocating different frequency resources (resource blocks or subcarriers) to cell edge terminals, as one example of the Coordinated Multi-Point (CoMP) technology. Here, the CS may also be referred to as interference control.

The effect of the scheduling of the base station according to the present disclosure is illustrated in FIG. 13(a). OLRC (k,m) using 'ack/nack' of the terminal in (1) may serve to control the initial transmission block error rate (bler) for the terminal according to the ratio of the increased amount of the OLRC value by 'ack' to the decreased amount of the OLRC value by 'nack'.

When the data transmission rate that can be actually received by the application of the CRS interference mitigation function of the terminal is R1, the initial data transmission rate that can be allocated by the base station is R3 in a case where the CS is not applied, and the data transmission rate that can be allocated by the base station is R2 in a case where the CS is applied. The base station can allocate R1 as the data transmission rate when scheduling in consideration of the terminal having the CRS interference function.

FIG. 13(b) is a diagram illustrating an increase in the initial transmission allocation rate when only the CS is reflected according to the related art. Referring to FIG. 13(b), when scheduling by reflecting only the CS, the base station can allocate the data transmission rate to R2, and then the data transmission rate reaches R1 with the OLRC by 'ack/nack' of the terminal. As a result, the performance gain is obtained depending on the OLRC increase rate.

Therefore, when the base station allocates the data transmission rate by simultaneously reflecting the CS and the CRS interference mitigation function of the UE as illustrated in FIG. 13(a), the transmission efficiency gain of the terminal occurs compared with the case of FIG. 13(b) where only the CS is reflected.

While the specification and drawings are set forth to illustrate embodiments of the present disclosure and specific terms are employed, they are used merely in a general sense for ease of description and for easy understanding, and are not intended to limit the scope of the present disclosure. It will be apparent to those skilled in the art that other modifications based on the technical spirit of the present disclosure are possible in addition to the embodiments disclosed herein.

The invention claimed is:

1. An interference control method by a terminal in a wireless communication system, comprising:
    transmitting, to a pico base station, at least one of an identification message to distinguish the terminal from other terminals and an operation related message regarding whether CRS interference mitigation operation is performed;
    in case that the terminal does not transmit the operation related message, receiving, from the pico base station, a first message based on at least one of the identification message, wherein the first message having a preset pattern is a measurement subset message configured according to the preset pattern regardless of an almost blank subframe (ABS) pattern;
    receiving, from the pico base station, a second message including at least one physical cell ID corresponding to at least one adjacent base station to identify a common reference signal (CRS) transmitted by a macro base station;
    triggering a CRS interference mitigation function of the terminal based on the first message and performing the CRS interference mitigation function based on the second message to mitigate interference caused by the CRS transmitted by the macro base station; and
    receiving, from the pico base station, data by removing the interference caused by the CRS based on the CRS interference mitigation function,
    wherein the measurement subset message is generated by the pico base station regardless of whether the pico base station received the ABS pattern from the macro base station.

2. The interference control method of claim 1, wherein the second message further includes information on an adjacent base station which is a target of the CRS interference mitigation function.

3. The interference control method of claim 1, further comprising:
    transmitting a third message indicating whether the terminal supports the CRS interference mitigation function to the pico base station.

4. The interference control method of claim 1, wherein a data transmission rate of the pico base station to the terminal is determined based on a signal to interference-plus-noise ratio (SINR) of the pico base station to the terminal, and the SINR is determined in relation to an interference signal strength reflecting the interference caused by the CRS which is removed based on the CRS interference mitigation function of the terminal.

5. An interference control method by a pico base station in a wireless communication system, comprising:
    receiving, from a terminal, at least one of an identification message to distinguish the terminal from other terminals and an operation related message regarding whether CRS interference mitigation operation is performed;
    in case that the pico base station does not receive the operation related message, identifying whether the terminal supports a common reference signal (CRS) interference mitigation function based on the identification message for mitigating interference caused by a CRS transmitted by a macro base station;
    generating a first message having a preset pattern, wherein the first message is a measurement subset message configured according to the preset pattern regardless of an almost blank subframe (ABS) pattern;
    transmitting, to the terminal, the first message based on the terminal supporting the CRS interference mitigation function; and
    transmitting, to the terminal, a second message including at least one physical cell ID corresponding to at least one adjacent base station to identify the CRS transmitted by the macro base station,
    wherein the CRS interference mitigation function is triggered based on the first message and the CRS interference mitigation function is performed based on the second message, and wherein the measurement subset message is generated by the pico base station regardless of whether the pico base station received the ABS pattern from the macro base station.

6. The interference control method of claim 5, wherein the second message further includes information on an adjacent base station which is a target of the CRS interference mitigation function.

7. The interference control method of claim 5, further comprising:
  receiving a third message indicating whether the terminal supports the CRS interference mitigation function from the terminal.

8. A terminal configured to control interference in a wireless communication system, the terminal comprising:
  a transceiver; and
  a controller coupled with the transceiver and configured to control to:
    transmit, to a pico base station, at least one of an identification message to distinguish the terminal from other terminals and an operation related message regarding whether CRS interference mitigation operation is performed,
    in case that the terminal does not transmit the operation related message, receive, from the pico base station, a first message based on at least one of the identification message, wherein the first message having a preset pattern is a measurement subset message configured according to the preset pattern regardless of an almost blank subframe (ABS) pattern,
    receive, from the pico base station, a second message including at least one physical cell ID corresponding to at least one adjacent base station to identify a common reference signal (CRS) transmitted by a macro base station,
    trigger a CRS interference mitigation function of the terminal based on the first message and performing the CRS interference mitigation function based on the second message to mitigate interference caused by the CRS transmitted by the macro base station, and
    receive, from the pico base station, data by removing the interference caused by the CRS based on the CRS interference mitigation function,
  wherein the measurement subset message is generated by the pico base station regardless of whether the pico base station received the ABS pattern from the macro base station.

9. The terminal of claim 8, wherein the second message further includes information on an adjacent base station which is a target of the CRS interference mitigation function.

10. The terminal of claim 8, wherein the controller performs a control to transmit a third message indicating whether the terminal supports the CRS interference mitigation function to the serving base station.

11. A pico base station configured to control interference in a wireless communication system, the pico base station comprising:
  a transceiver; and
  a controller coupled with the transceiver and configured to control to:
    receive, from a terminal, at least one of an identification message to distinguish the terminal from other terminals and an operation related message regarding whether CRS interference mitigation operation is performed,
    in case that the pico base station does not receive the operation related message, identify whether the terminal supports a common reference signal (CRS) interference mitigation function based on the identification message for mitigating interference caused by a CRS transmitted by a macro base station,
    generate a first message having a preset pattern, wherein the first message is a measurement subset message configured according to the preset pattern regardless of an almost blank subframe (ABS) pattern,
    transmit, to the terminal, the first message based on the terminal supporting the CRS interference mitigation function, and
    transmit, to the terminal, a second message including at least one physical cell ID corresponding to at least one adjacent base station to identify the CRS transmitted by the macro base station,
  wherein the CRS interference mitigation function is triggered based on the first message and the CRS interference mitigation function is performed based on the second message, and
  wherein the measurement subset message is generated by the pico base station regardless of whether the pico base station received the ABS pattern from the macro base station.

* * * * *